US012383911B2

(12) United States Patent
Weber

(10) Patent No.: US 12,383,911 B2
(45) Date of Patent: Aug. 12, 2025

(54) HYDRAULIC ACCUMULATOR

(71) Applicant: Hydac Technology GmbH, Sulzbach / Saar (DE)

(72) Inventor: Norbert Weber, Saarsbrücken (DE)

(73) Assignee: HYDAC TECHNOLOGY GMBH, Sulzbach/Saar (DE)

( * ) Notice: Subject to any disclaimer, the term of this patent is extended or adjusted under 35 U.S.C. 154(b) by 0 days.

(21) Appl. No.: 18/724,353

(22) PCT Filed: Dec. 22, 2022

(86) PCT No.: PCT/EP2022/087420
§ 371 (c)(1),
(2) Date: Jun. 26, 2024

(87) PCT Pub. No.: WO2023/138874
PCT Pub. Date: Jul. 27, 2023

(65) Prior Publication Data

US 2025/0065340 A1 Feb. 27, 2025

(30) Foreign Application Priority Data

Jan. 20, 2022 (DE) ..................... 10 2022 000 197.7

(51) Int. Cl.
*B03C 1/03* (2006.01)
*B03C 1/033* (2006.01)
(Continued)

(52) U.S. Cl.
CPC ............ *B03C 1/286* (2013.01); *B03C 1/0332* (2013.01); *F15B 1/22* (2013.01); *B03C 2201/18* (2013.01); *B03C 2201/28* (2013.01)

(58) Field of Classification Search
CPC .............. B03C 2201/28; B03C 1/0332; B03C 2201/18; B03C 1/286
See application file for complete search history.

(56) References Cited

U.S. PATENT DOCUMENTS

| | | | | |
|---|---|---|---|---|
| 5,445,034 | A | 8/1995 | Peter | |
| 10,422,353 | B2 * | 9/2019 | Pippes | F15B 1/24 |

FOREIGN PATENT DOCUMENTS

| | | | |
|---|---|---|---|
| CN | 111396379 A | 7/2020 | |
| DE | 4116482 A1 | 5/1991 | |

(Continued)

OTHER PUBLICATIONS

Search Report for International Application No. PCT/EP2022/087420, 4 pages, Mar. 27, 2023.

*Primary Examiner* — Abiy Teka
(74) *Attorney, Agent, or Firm* — Slayden Grubert Beard PLLC

(57) ABSTRACT

The disclosure relates to a hydraulic accumulator, in particular in the form of a piston-type accumulator, having a separating element which is arranged in an accumulator housing and fluid-tightly separates two fluid chambers, in particular a closed accumulator chamber comprising a working gas and a liquid chamber comprising an operating liquid such as hydraulic oil, from one another, wherein a fluid port is fluidically connected to one of the fluid chambers. The hydraulic accumulator is characterised in that the fluid port has a magnetic-field-generating device which is received in a fixed position in the fluid port and separates magnetizable particles out of the fluid passing through the fluid port, to purify said fluid.

20 Claims, 2 Drawing Sheets

(51) Int. Cl.

| | |
|---|---|
| ***B03C 1/28*** | (2006.01) |
| ***F15B 1/22*** | (2006.01) |

(56) References Cited

FOREIGN PATENT DOCUMENTS

| | | | | | |
|---|---|---|---|---|---|
| DE | 10320799 | A1 | * | 6/2004 | ............ B60T 13/686 |
| DE | 102016007798 | A | | 12/2017 | ................ F15B 1/24 |
| EP | 0313539 | B1 | | 5/1990 | ................ F15B 1/24 |
| FR | 1366046 | A | | 7/1964 | ................ F15B 1/26 |
| JP | 2015190480 | A | * | 11/2015 | |
| WO | WO-2004081389 | A1 | * | 9/2004 | ................ F15B 1/24 |

* cited by examiner

HYDRAULIC ACCUMULATOR

CROSS-REFERENCE TO RELATED APPLICATIONS

This application claims priority to German Patent Application No. DE 10 2022 000 197.7, filed on Jan. 20, 2022 with the German Patent and Trademark Office. The contents of the aforesaid Patent Application are incorporated herein for all purposes.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

The disclosure relates to a hydraulic accumulator, in particular in the form of a piston accumulator, having a separating element, which is arranged in an accumulator housing and separates two fluid chambers from one another in a fluid-tight manner, in particular a closed accumulator chamber comprising a working gas, from a liquid chamber comprising an operating liquid, such as hydraulic oil, wherein a fluid port is fluidically connected to one of the fluid chambers.

Hydraulic accumulators, such as (hydropneumatic) piston accumulators, are used in hydraulic systems to receive defined volumes of pressurised liquid, such as hydraulic oil, and return them to the system if necessary. In the hydropneumatic piston accumulators that are usually used, in which the piston separates the oil-side liquid chamber from the accumulator chamber contained in the accumulator housing that receives a working gas such as nitrogen gas, the position of the piston changes during operation of the hydraulic accumulator such that the hydraulic accumulator receives hydraulic oil when the pressure rises, with the working gas in the other fluid or accumulator chamber being compressed at the same time during this process. When the pressure falls, the gas thus compressed expands again and, in the process, pushes stored hydraulic oil back into the hydraulic operating circuit. Due to the resulting changes in the volumes of the working chambers arising during operation, this results in a corresponding axial movement of the piston inside the accumulator housing in each case.

As such, during operation of hydraulic devices such as operating cylinders, for example, corresponding hydraulic accumulators are connected to the hydraulic operating circuit, which generally comprises filter devices with filter elements to clean particulate contamination from an operating fluid, such as hydraulic oil, and said filter devices can be replaced with new elements if necessary. Despite these filter devices, the possibility cannot be ruled out that contaminated particles might pass to the clean side of the fluid and then cause damage to the hydraulic accumulator and its components once inside the corresponding accumulator. Filter elements are also limited with regard to their throughput capacity, with the result that these cannot always be used with very high flow rates and corresponding high fluid pressures. Particularly when using piston accumulators, particulate contamination can inadvertently pass into the sealing system of the separating piston, which can cause failure of the accumulator and any connected hydraulic devices. As the arising particulate contamination is often the result of abrasion on the hydraulic devices, these are generally metallic in nature and any such particles that arise, particularly in the event of mechanical failure, may also be of such a magnitude as to cause the sealing devices on the separating piston along with their elastomer material to leak or even be destroyed.

DE 41 16 482 A1 discloses a method and device for measuring the pressure of a working gas in a gas pressure accumulator which can be connected to a hydraulic operating circuit and in which the working gas is separated from the operating or working liquid by means of a separating element in the form of an elastomer accumulator bladder. When the accumulator bladder is in a predefinable position, the gas pressure that can be assigned to the bladder in this position is measured by means of a pressure transducer arranged on the fluid side, for which purpose the position of a disc valve of the accumulator is monitored by means of a monitoring device. For this purpose, the disc valve comprises a switching element with a permanent magnet in a fluid port of the accumulator and the associated sensor consists of a switch that can be actuated by the magnet or uses the so-called Hall effect as soon as the switching element moves past the corresponding sensor as a function of the actuating position of the disc valve and triggers said sensor accordingly.

The cuboid magnet thus moving continuously to and from during operation of the accumulator is as ill-suited as a ring magnet on the gas side of the accumulator housing to effectively counteracting particulate contamination arising on the liquid side in the accumulator.

SUMMARY

A need exists to improve a hydraulic accumulator such that failure can be reduced even in the event of metallic particulate contamination arising.

The need is addressed by the subject matter of the independent claim(s). Embodiments of the invention are described in the dependent claims, the following description, and the drawings.

DESCRIPTION

Figure 1:
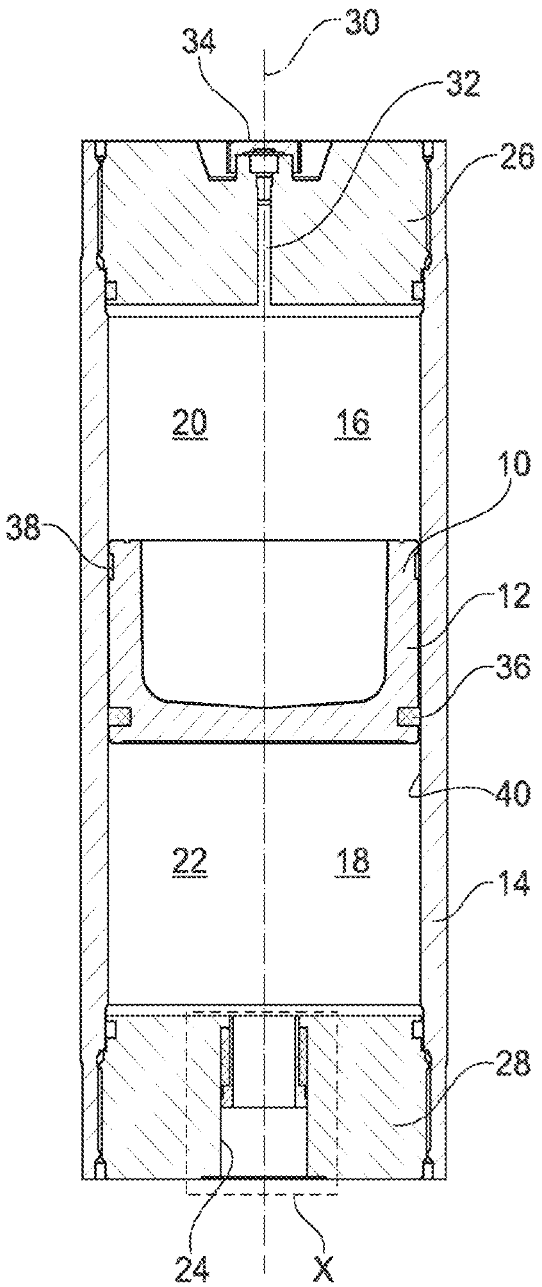
FIG. 1 shows the main structure of an example hydraulic accumulator in the form of a longitudinal section.

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In some embodiments, the fluid port comprises a magnetic-field-generating device, which is received in a fixed position in the fluid port and serves to separate magnetisable particles out of the fluid passing through the fluid port so as to purify said fluid. This provides an opportunity to allow a sufficiently strong magnetic field, fixed in position, to arise in the fluid port region of the accumulator housing such that magnetisable, in particular metallic, particles can no longer pass onto the liquid side of the accumulator and thus are likewise unable to cause damage, in particular damage to the separating element, such as a separating piston. In particular, the particulate contamination cannot pass onto the sealing side of the separating piston with its sealing rings and guide bands of a hydropneumatic piston accumulator, which may otherwise, alongside sealing problems, also cause the separating piston inside the accumulator housing to 'catch' due to friction, meaning that the separating piston can no longer carry out any movement, making the hydraulic accumulator in its entirety unusable. In particular, when managing fluid flows where filter devices are at the limits of their capacity, this achieves a means of reliably cleaning metallic, magnetisable particle parts from the fluid flow by means of magnetic separation in the hydraulic accumulator.

In some embodiments, it is provided that the magnetic-field-generating device consists of a permanent magnet, which is installed in a housing lid of the accumulator housing and at least partially surrounds or passes through the associated fluid port. In this manner, the entire fluid supply into the accumulator housing is controlled and cleaned of particulate contamination before it enters the fluid side. As such, the fluid flow is thus passed through the permanent magnet or past said permanent magnet along a predefinable, relatively long distance such that cleaning takes place extremely efficiently.

For example, in this case, it is provided that the magnetic-field-generating device is predominantly arranged in the part of the fluid port that is adjacent to the fluid chamber in the accumulator housing to which the fluid port leads. Due to the corresponding arrangement, this ensures that any particles that might inadvertently pass between the separating element and the housing lid can still be discharged from the correspondingly reducing gap in the direction of the magnet. Furthermore, there is still enough space in the otherwise free region of the fluid port to be able to attach, in particular screw in, pipework from the hydraulic operating circuit.

In special cases, it would also be conceivable to replace the permanent magnet with a magnet through which a current can be passed to increase the efficiency of the permanent magnet, which presupposes an energy supply to the accumulator housing.

In some embodiments, it is provided that the magnetic-field-generating device comprises a ring, which is received in an associated wall receptacle in the fluid port and held in position by a fixing sleeve. By virtue of the closed ring guide, a very strong, fixed magnetic field is formed for particle cleaning; alternatively, however, it is also possible to use individual ring segments here instead of a closed ring. For example, it is also provided that the fixing sleeve, which is designed as a screw-in part having its male thread engaging in a correspondingly formed female thread in the fluid port, fixes the ring in a supporting manner against an abutment shoulder of the fluid port. In this manner, secure positioning of the magnet ring in the fluid port of the accumulator is achieved.

For example, in some embodiments, it is additionally or alternatively provided that the magnetic-field-generating device is a rod, which is part of a fixing plate with passages for fluid guidance and is inserted, for example screwed, into the fluid port. In this manner, the fluid flow is guided past the centrally located rod on all sides such that good cleaning of the fluid from magnetisable particles is thus also achieved. If necessary, it can also be provided that the ring is combined with the rod in a shared arrangement.

It has also been possible to obtain particularly good cleaning results if the free end of the rod, which is adjacent to and facing one fluid chamber of the accumulator housing, ends in a concentric arrangement with the longitudinal axis of the accumulator housing flush with the upper side of the associated housing lid, said upper side facing this fluid chamber.

In a space-saving manner, it is for example provided that the fluid port for the supply and discharge of fluid passes through the middle of the housing lid and is arranged concentrically with respect to the longitudinal axis of the accumulator housing.

As, due to the use of filter elements in the hydraulic operating circuit, magnetisable particulate contamination should only tend to arise rarely, manual cleaning of the magnetic-field-generating device is therefore not essential due to excessive accrual of dirt. For example, however, it is possible, in any event, to remove the magnetic-field-generating device from the fluid port for cleaning and/or replacement purposes, and, after cleaning or carrying out maintenance work respectively, to re-insert it back into the fluid port for further operation. The hydraulic accumulator would need to be at a standstill for the corresponding replacement operation.

To ensure energy-efficient use with full operating capacity, it is for example provided that the hydraulic accumulator is designed such that the separating element is formed by a separating piston that can be displaced longitudinally inside the accumulator housing, said separating piston, in one of its possible stop positions, being flush with the fluid port in contact with the housing lid and covering this without any offset when the fluid chamber is completely drained. During operation of the separating piston, particularly when returning the hydraulic liquid from the liquid chamber in the direction of the hydraulic operating circuit, high fluid flow speeds arise, which, in some cases, allows the magnetic-field-generating device to be cleaned by this fluid flow, the collected and discharged particulate contamination therein then being able to be cleaned from the fluid flow via a filter element during standard filtration operation.

The hydraulic accumulator according to the teachings herein is discussed in greater detail below with reference to further embodiments, shown in the drawings, which are in outline and not to scale. Specific references to components, process steps, and other elements are not intended to be limiting.

The hydraulic accumulator shown in FIG. 1 in the form of a so-called piston accumulator comprises a separating piston 12 as a separating element 10, said piston separating two fluid chambers 16, 18 arranged in an accumulator housing 14. The upper fluid chamber 16 as viewed on FIG. 1 forms a closed accumulator chamber 20 for receiving a working gas, such as nitrogen gas for example. The lower fluid chamber 18 forms a liquid chamber 22 for the purpose of receiving an operating fluid, such as hydraulic oil for example. The corresponding fluid chamber 18 or liquid chamber 22 respectively is provided with a fluid port 24, by means of which the accumulator, which is not shown in further detail, can be connected to a hydraulic operating circuit of the conventional kind.

The accumulator housing 14 is designed as a kind of circular hollow cylinder or cylindrical tube, which, at both free ends thereof, is tightly sealed by a screwed-in housing lid 26, 28 in each case, between which the separating piston 12 is guided, in a freely displaceable manner, along the longitudinal axis 30 of the housing.

The upper housing lid 26 comprises a through fluid duct 32, which is sealed by a screw plug 34 as shown in FIG. 1. By means of the corresponding arrangement 32, 34, the accumulator can, if necessary, be drained of working gas in the chamber 16, for example for maintenance purposes, but the chamber 16 can also be filled if there is insufficient working gas. The separating piston 12 itself is designed as a so-called hollow piston for the purpose of increasing the effective gas volume on the fluid chamber 16 side. The outer circumference of the separating piston 12 is guided along the inside 40 of the cylindrical accumulator housing 14 via at least one sealing ring 36 and at least one guide band 38. When manufacturing practical embodiments, a plurality of such sealing rings and guide bands can be fitted, also in combination with one another, on the outer circumference of the separating piston 12.

The previous design of such a hydraulic accumulator, here in the form of a piston accumulator, is standard and is therefore not described in any further detail, or only insofar as is necessary in order to understand the teachings herein. Thus, in accordance with the teachings herein, the fluid port 24, as is particularly evident in the representation shown in FIG. 2, comprises a magnetic-field-generating device 42 in the lower housing lid 28, said device being received in a fixed position in the fluid port 24 for the purpose of separating magnetisable particles from the fluid passing through the fluid port 24 so as to purify said fluid. The magnetic-field-generating device 42 in this case consists of a permanent magnet 44 in the form of a closed ring 46. The corresponding magnet ring 46 at least partially surrounds the fluid port 24 and, as shown in FIGS. 1 and 2, is arranged predominantly in the part of the fluid port 24 that is adjacent to the fluid chamber 18 or the liquid chamber 22 respectively, to which the fluid port 24 leads.

Figure 2:
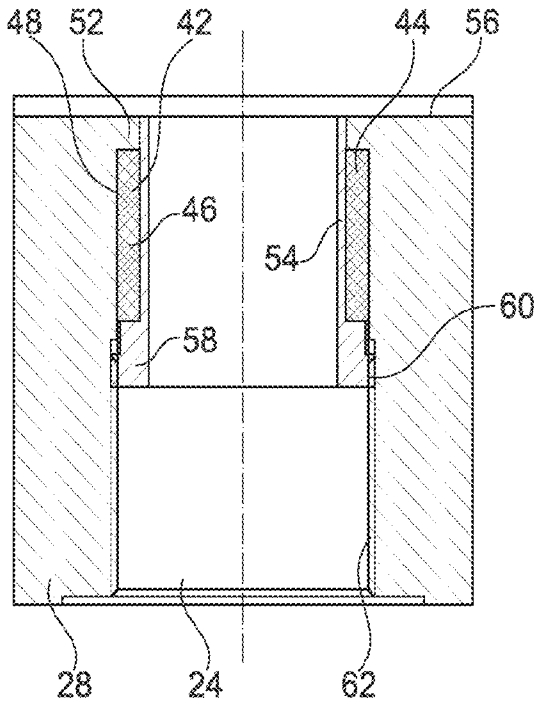
FIG. 2 shows an enlarged view of a section referred to as X in FIG. 1.

As is also shown in FIG. 2, the magnetic-field-generating device 42 in the form of the magnet ring 46 is received in an associated wall receptacle 48 in the fluid port 24 and as such held in position by a fixing sleeve 50. In this process, the ring 48, as viewed on FIGS. 1 and 2, is supported on its upper side on an annular projection 52 in the wall receptacle 48, which is achieved by a reduction in the diameter of the lower housing lid 28 in this region. The fixing sleeve 50 comprises a cylindrical supporting wall 54, with which the ring 46 is guided on its inner circumference and thus supported. The cylindrical supporting wall 54 ends with the upper side 56 of the lower housing lid 28. Furthermore, the fixing sleeve 50, originating from the cylindrical supporting wall 54, comprises an outwardly widening annular projection 58 at its base, said projection protruding beyond the ring 46 from beneath and holding it in position in this manner. A male thread 60 is attached to the outer circumference of the annular projection 58, said male thread being screwed into a female thread 62 of the lower housing lid 28, which thus delimits the fluid port 24. The fixing sleeve 50 can be screwed into and out of the housing lid 28 by means of the corresponding threaded section, formed by the male thread 60 and the female thread 62.

Any magnetisable particles in the fluid flow which pass through the fluid port 24 in the direction of the liquid chamber 22 are held back by the magnet ring 46 in this manner and deposited on the inner circumferential side of the fixing sleeve 50, in particular in the region of the cylindrical supporting wall 54. As viewed on FIG. 1, if the separating piston 12 moves into its lowermost position when the liquid chamber 22 is completely empty, this then, in any event, ensures that no particulate contamination is deposited on the upper side 56 of the lower housing lid 28 and potentially inadvertently passes onto the side of the sealing ring 36, between the sealing ring 36 and the inside 40 of the accumulator housing. As such, this rules out the possibility of magnetisable particulate contamination working its way into the sealing ring 36, resulting in a leakage point being created between the accumulator chamber 20 with the working gas and the liquid chamber 22, which causes the hydraulic accumulator to become unusable, in particular if the working gas evaporates from the accumulator chamber 20 in the direction of the liquid chamber 22. A defined pretensioning of the accumulator on its gas side would then thus no longer be guaranteed in any event. Furthermore, the possibility of the particles, particularly if the particles are of a corresponding size, causing "catching" of the separating piston 12 on the inside 40 of the accumulator housing 14 such that said separating piston is no longer able to move in a longitudinally displaceable manner, cannot be ruled out, which also leads to the hydraulic accumulator becoming unusable. This is avoided in any event with the magnetic-field-generating device 42.

Specifically in construction machinery, failure or wear of active elements such as valves, operating cylinders or actuators respectively may lead to metallic abrasion, which can then be 'flushed" through the circuit up to the hydraulic accumulators. Corresponding hydraulic accumulators are generally also used in braking systems of operating machinery such as construction or agricultural machinery, where, due to destruction of the seal of the separating piston 12 due to metallic particles, operation may be restricted or even completely obstructed.

By using magnetic elements, such as the ring magnet 46 in this case, such magnetisable metallic particles can be extracted from the hydraulic fluid and thus the service life of components can be extended. By 'fishing out' such particles by means of a magnetic-field-generating device 42 in the inlet region of hydraulic accumulators in closed hydraulic circuits, this prevents the corresponding metallic particles leaving the hydraulic accumulator and potentially causing damage to sensitive components such as valves, piston accumulator seals, etc., with the result that all components of a hydraulic circuit are protected from such adverse effects. This therefore has no parallel in the prior art.

Figure 3:
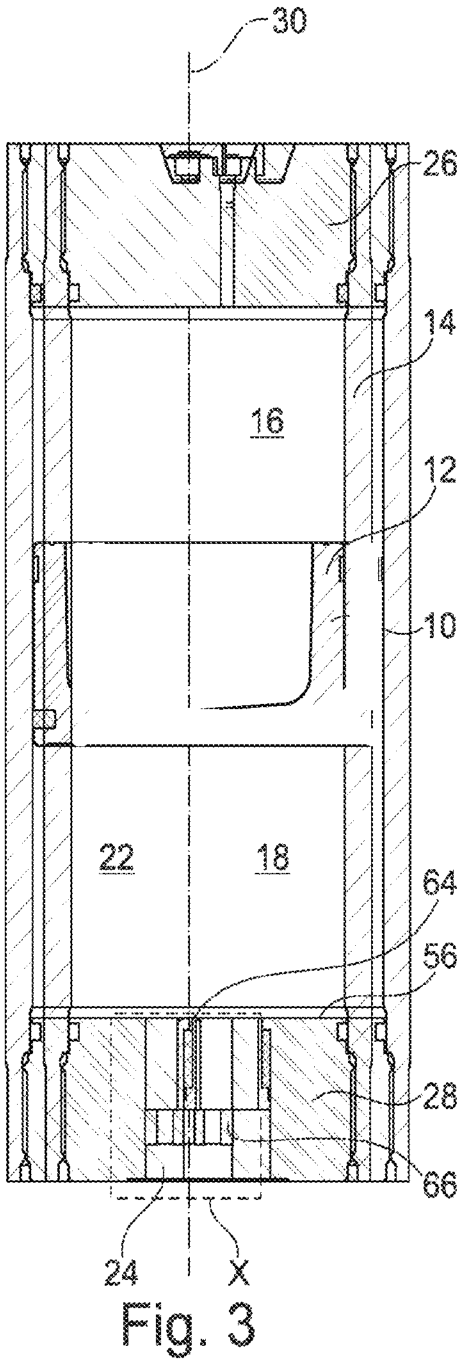
FIG. 3 shows a further embodiment of a hydraulic accumulator in the form of a longitudinal section.
Figure 4:
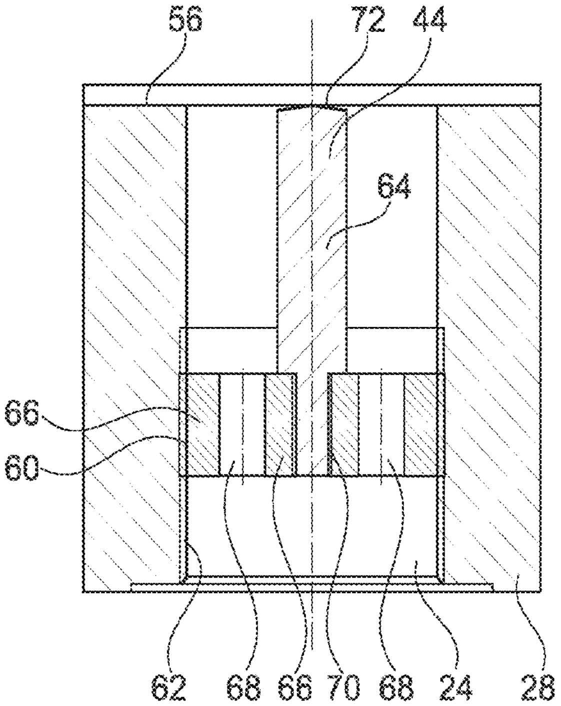
FIG. 4 shows an enlarged view of a section referred to as X in FIG. 3.

The further embodiment according to FIGS. 3 and 4 is only explained insofar as it differs substantially from the preceding embodiment. In this process, the same reference numerals are used for the same structural components and the embodiments provided previously then also apply accordingly to the structure shown in FIGS. 3 and 4.

In the corresponding embodiment, the magnetic-field-generating device consists of a magnetic rod 64, which forms part of a fixing plate 66 with passages 68 and, for fluid guidance through the fluid port 24, is inserted, in particular screwed, into said fluid port by means of a threaded section with a male thread 60 as well as a corresponding female thread 62. The lower end of the rod 64 is inserted flush in a central recess 70 in the fixing plate 66, for example screwed in or glued in. The free upper end 72 of the rod 64 is designed to be spherical and adjacent and facing one fluid chamber 18 or the liquid chamber 22 respectively. Furthermore, the rod 64 is guided in concentric arrangement with the longitudinal axis 30 of the accumulator housing 14 and ends with its upper side flush with the upper side 56 of the associated housing lid 28, facing this fluid chamber 18.

The passages 68 arranged adjacent to the rod 64 in the fixing plate 66, two parts of which are shown in FIG. 3 and FIG. 4, can be grouped in multiple instances around the longitudinal axis 30 in diametrical arrangement to one another. In any event, a fluid port 24 is thus also formed through the housing lid 28 in the accumulator housing 14, which passes through the centre of the associated housing lid 28 for fluid supply and discharge into and out of the fluid chamber 18 and in this process is arranged concentrically with respect to the longitudinal axis 30 of the accumulator housing 14. As the passages 68 each individually and in total have a smaller free cross-section than the free cross-section of the fluid port 24, this thus has the effect of restricting the fluid flow via the fixing plate 66 with the individual passages 68 in the form of holes.

While, in the embodiment shown in FIGS. 1 and 2, the fluid flow flows through the ring magnets 46, in the embodiment shown in FIGS. 3 and 4, the fluid flow is divided via the passages 68 and the thus divided fluid flow flows around the outer circumference of the centrally located magnetic rod 64. Any magnetisable particles thus adhere to the cylindrically formed magnetic rod 64 from outside and are accordingly prevented from being able to enter the liquid chamber 22 with the separating piston 12 and its sealing and guide system 36, 38. In this manner, this therefore also ensures reliable retention of any magnetisable particles arising by the magnetic-field-generating device 42.

The separating piston 12 may form a hollow piston to increase the volume of the gas chamber 20 in the direction of the gas side 16; a corresponding hollow piston design is, however, also possible, additionally or alternatively, in the reverse arrangement on the fluid side 18 so that the piston 12 does not impact the housing lid 28 towards the liquid side 22 with its entire surface under high pressure conditions. Furthermore, it is also possible to design the separating piston 12 as a solid structure in the form of a cylindrical plate to ensure that the corresponding separating piston 12 is unable to impact the housing lid 26 on the gas side 16 in the event of high operating pressures.

All housing parts surrounding the permanent magnet 44 are for example made of non-magnetisable material, such as stainless steel, so that no retained particles are able to remain in the respective opening, in particular when unscrewing the screw 52, or so that the particles are easier to remove when unscrewing the insert 56.

The magnetisable particle separation device does not need to be restricted to piston accumulator solutions but can instead also be used in other accumulator solutions with a separating element, such as bladder accumulators, membrane accumulators and bellows accumulators. Furthermore, if necessary, a valve may also be inserted in the fluid port 24, such as, for example, a disc valve usually used for bladder accumulators, without impairing the action of the magnetic-field-generating device 42.

The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, device, or other unit may be arranged to fulfil the functions of several items recited in the claims. Likewise, multiple processors, devices, or other units may be arranged to fulfil the functions of several items recited in the claims.

The term "exemplary" used throughout the specification means "serving as an example, instance, or exemplification" and does not mean "preferred" or "having advantages" over other embodiments. The term "in particular" and "particularly" used throughout the specification means "for example" or "for instance".

The mere fact that certain measures are recited in mutually different dependent claims or embodiments does not indicate that a combination of these measures cannot be used to advantage. Any reference signs in the claims should not be construed as limiting the scope.

What is claimed is:

1. A hydraulic accumulator, having a separating element which is arranged in an accumulator housing and separates two fluid chambers from one another in a fluid-tight manner, wherein a fluid port is fluidically connected to one of the fluid chambers, wherein the fluid port has a magnetic-field-generating device which is received in a fixed position in the fluid port and separates magnetisable particles out of the fluid passing through the fluid port so as to purify said fluid, and wherein the magnetic-field-generating device comprises a ring, which is received in an associated wall receptacle in the fluid port and held in position by a fixing sleeve.

2. The hydraulic accumulator of claim 1, wherein the magnetic-field-generating device comprises a permanent magnet, which is installed in a housing lid of the accumulator housing, and at least partially surrounds or passes through the fluid port.

3. The hydraulic accumulator of claim 1, wherein the magnetic-field-generating device is predominantly arranged in a part of the fluid port that is adjacent to the fluid chamber in the accumulator housing to which the fluid port leads.

4. The hydraulic accumulator of claim 3, wherein the fixing sleeve, which is configured as a screw-in part having its male thread engaging in a correspondingly formed female thread in the fluid port, fixes the ring in a supporting manner against an abutment shoulder of the fluid port.

5. The hydraulic accumulator of claim 2, wherein the magnetic-field-generating device is predominantly arranged in a part of the fluid port that is adjacent to the fluid chamber in the accumulator housing to which the fluid port leads.

6. The hydraulic accumulator of claim 2, wherein the fixing sleeve, which is configured as a screw-in part having its male thread engaging in a correspondingly formed female thread in the fluid port, fixes the ring in a supporting manner against an abutment shoulder of the fluid port.

7. The hydraulic accumulator of claim 1, wherein the fixing sleeve, which is configured as a screw-in part having its male thread engaging in a correspondingly formed female thread in the fluid port, fixes the ring in a supporting manner against an abutment shoulder of the fluid port.

8. The hydraulic accumulator of claim 1, wherein the magnetic-field-generating device is a formed by a rod, which is part of a fixing plate with passages for fluid guidance and is inserted into the fluid port.

9. The hydraulic accumulator of claim 1, wherein a free end of a rod, which is adjacent to and facing one fluid chamber of the accumulator housing, is in a concentric arrangement with a longitudinal axis of the accumulator housing flush with an upper side of an associated housing lid facing this fluid chamber.

10. The hydraulic accumulator of claim 1, wherein the fluid port for a supply and discharge of fluid passes through the middle of a housing lid and is arranged concentrically with respect to a longitudinal axis of the accumulator housing.

11. The hydraulic accumulator of claim 1, wherein the magnetic-field-generating device can be removed from the fluid port and inserted back in again for cleaning and/or replacement purposes.

12. The hydraulic accumulator of claim 1, wherein the separating element is formed by a separating piston that can be displaced longitudinally inside the accumulator housing, said separating piston, in one of its possible stop positions, being flush with the fluid port in contact with a housing lid and covering this without any offset when one of the fluid chambers is completely empty.

13. The hydraulic accumulator of claim 1, wherein the hydraulic accumulator is a piston accumulator.

14. The hydraulic accumulator of claim 1, wherein a first of the two fluid chambers is a closed accumulator chamber for a working gas.

15. The hydraulic accumulator of claim 1, wherein a second of the two fluid chambers is a liquid chamber for an operating liquid.

16. The hydraulic accumulator of claim 1, wherein the fixing sleeve, which is configured as a screw-in part having its male thread engaging in a correspondingly formed female thread in the fluid port, fixes the ring in a supporting manner against an abutment shoulder of the fluid port.

17. The hydraulic accumulator of claim 1, wherein the magnetic-field-generating device is a formed by a rod, which is part of a fixing plate with passages for fluid guidance and is screwed into the fluid port.

18. A hydraulic accumulator, having a separating element which is arranged in an accumulator housing and separates two fluid chambers from one another in a fluid-tight manner, wherein a fluid port is fluidically connected to one of the fluid chambers, wherein the fluid port has a magnetic-field-generating device which is received in a fixed position in the fluid port and separates magnetisable particles out of the fluid passing through the fluid port so as to purify said fluid, and wherein the magnetic-field-generating device is a formed by a rod, which is part of a fixing plate with passages for fluid guidance and is inserted into the fluid port.

19. A hydraulic accumulator, having a separating element which is arranged in an accumulator housing and separates two fluid chambers from one another in a fluid-tight manner, wherein a fluid port is fluidically connected to one of the fluid chambers, wherein the fluid port has a magnetic-field-generating device which is received in a fixed position in the fluid port and separates magnetisable particles out of the fluid passing through the fluid port so as to purify said fluid, and wherein a free end of a rod, which is adjacent to and facing one fluid chamber of the accumulator housing, is in a concentric arrangement with a longitudinal axis of the accumulator housing flush with an upper side of an associated housing lid facing this fluid chamber.

20. A hydraulic accumulator, having a separating element which is arranged in an accumulator housing and separates two fluid chambers from one another in a fluid-tight manner, wherein a fluid port is fluidically connected to one of the fluid chambers, wherein the fluid port has a magnetic-field-generating device which is received in a fixed position in the fluid port and separates magnetisable particles out of the fluid passing through the fluid port so as to purify said fluid, and wherein the magnetic-field-generating device is a formed by a rod, which is part of a fixing plate with passages for fluid guidance and is screwed into the fluid port.

* * * * *